(12) United States Patent
Kirkwood et al.

(10) Patent No.: US 10,851,850 B2
(45) Date of Patent: Dec. 1, 2020

(54) CONTROLLABLE POWERTRAIN INPUT MODULE

(71) Applicant: LINAMAR CORPORATION, Guelph (CA)

(72) Inventors: Malcolm E. Kirkwood, Livonia, MI (US); Woodrow Lee Barrie, Oxford, MI (US); Tom Reedy, South Lyon, MI (US); Arnold Byron Gomez-Mesquita, Warren, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 16/313,512

(22) PCT Filed: Jun. 30, 2017

(86) PCT No.: PCT/US2017/040316
§ 371 (c)(1),
(2) Date: Dec. 27, 2018

(87) PCT Pub. No.: WO2018/005982
PCT Pub. Date: Jan. 4, 2018

(65) Prior Publication Data
US 2019/0249724 A1     Aug. 15, 2019

Related U.S. Application Data

(60) Provisional application No. 62/357,404, filed on Jul. 1, 2016.

(51) Int. Cl.
*F16D 25/0638* (2006.01)
*F16D 13/72* (2006.01)
(Continued)

(52) U.S. Cl.
CPC ......... *F16D 25/0638* (2013.01); *F16D 13/52* (2013.01); *F16D 13/64* (2013.01);
(Continued)

(58) Field of Classification Search
CPC .......... F16D 13/38; F16D 13/52; F16D 13/64; F16D 13/648; F16D 21/06; F16D 2121/0661; F16D 25/06; F16D 25/063; F16D 25/0635; F16D 25/0638; F16D 25/064; F16D 25/10; F16D 48/06; F16D 48/062; F16D 13/72; F16D 13/74; F16D 2065/1324; F16D 2069/004; F16D 69/02;
(Continued)

(56) References Cited

U.S. PATENT DOCUMENTS 3,016,769 A * 1/1962 Christenson ............ F16H 47/08
475/134
3,023,640 A     3/1962 Schou
(Continued)

FOREIGN PATENT DOCUMENTS

CN     203098617     7/2013
KR     100757107     9/2007

*Primary Examiner* — Jacob S. Scott
(74) *Attorney, Agent, or Firm* — Miller Canfield

(57) ABSTRACT

A controllable powertrain input module, placed between an input torque source and an automated ratio changing device, all of which is controlled by a powertrain control module (PCM) to optimize efficiency while satisfying an infinite number of input and output application scenarios.

19 Claims, 3 Drawing Sheets

(51) Int. Cl.

| | |
|---|---|
| *F16D 21/06* | (2006.01) |
| *F16D 13/64* | (2006.01) |
| *F16D 13/52* | (2006.01) |
| *F16D 13/74* | (2006.01) |
| *F16D 25/10* | (2006.01) |
| *F16D 48/06* | (2006.01) |
| *F16H 3/54* | (2006.01) |
| *F16D 65/02* | (2006.01) |
| *F16D 69/00* | (2006.01) |

(52) U.S. Cl.
 CPC ........... *F16D 13/648* (2013.01); *F16D 13/72* (2013.01); *F16D 13/74* (2013.01); *F16D 21/06* (2013.01); *F16D 25/10* (2013.01); *F16D 48/06* (2013.01); *F16H 3/54* (2013.01); *F16D 2065/1324* (2013.01); *F16D 2069/004* (2013.01); *F16D 2500/1026* (2013.01); *F16D 2500/1045* (2013.01); *F16D 2500/30406* (2013.01); *F16D 2500/50287* (2013.01); *F16H 2200/2005* (2013.01); *F16H 2200/2033* (2013.01); *F16H 2200/2035* (2013.01); *F16H 2200/2066* (2013.01); *F16H 2200/2082* (2013.01)

(58) Field of Classification Search
 CPC ..... F16D 2500/1026; F16D 2500/1045; F16D 2500/30406; F16D 2500/50287; F16H 3/54; F16H 2200/2005; F16H 2200/2066; F16H 2200/2082
 See application file for complete search history.

(56) References Cited

U.S. PATENT DOCUMENTS

| | | | |
|---|---|---|---|
| 4,010,833 A | 3/1977 | Brendel et al. | |
| 4,724,745 A * | 2/1988 | Sumiya | F16D 25/0638 192/48.614 |
| 4,915,204 A | 4/1990 | Klotz et al. | |
| 4,958,753 A * | 9/1990 | Nogle | F16D 25/0638 192/48.611 |
| 5,566,802 A | 10/1996 | Kirkwood | |
| 2004/0238314 A1 * | 12/2004 | Onishi | F16D 25/0638 192/48.611 |

* cited by examiner

CONTROLLABLE POWERTRAIN INPUT MODULE

CROSS-REFERENCE TO RELATED APPLICATION

This application claims priority to and all the benefits of U.S. Provisional Application No. 62/357,404 filed on Jul. 1, 2016, and entitled "A Controllable Powertrain Input Module".

BACKGROUND OF THE INVENTION

1. Field of the Invention

The present invention relates to the field of transmission systems. More particularly, the present invention relates to a controllable powertrain input module for a torque transmission system.

2. Background

Various forms of torque transmission systems and means of controlling such systems are known in the art. Typical prior art torque transmission systems, such as those for on and off highway, all-terrain, and commercial vehicles include one or more of:
a) hydrodynamic torque transfer units which operate using:
  i) pure fluid coupling, or
  ii) a more complex configuration of a) i) above such as a hydrodynamic torque converter exhibiting the ability to multiply input torque at specific points within its performance curve;
b) a hydrodynamic torque converter unit exhibiting characteristics of a) ii) above and which additionally incorporates an integral friction clutch and torsional dampening unit;
c) a manually applied friction clutch; and
d) a centrifugally applied friction clutch.

Using an on-highway vehicle as a typical example, the hydrodynamic torque converter is the most frequently utilized transmission device because of its initial start-up torque multiplication factor and its smooth power transmission characteristics. However, hydrodynamic torque converters have some drawbacks. Hydrodynamic torque transfer devices including fluid coupling devices and hydrodynamic torque converters tend to exhibit excessive relative slip at all points within their performance envelopes, resulting in a loss of device efficiency. Further, for a specific application configuration, the, design and performance characteristics of a fluid coupling or hydrodynamic torque converter are fixed and cannot be changed or adapted to external conditions during use. For hydrodynamic torque converters, when the hydrodynamic torque converter input speed is high and output speed is zero, the torque ratio created is at its maximum possible value the stalled state and the transmission device is at maximum possible inefficiency. The torque multiplication ratio then decreases exponentially as the hydrodynamic torque converter output speed approaches but never reaches the input speed.

A typical hydrodynamic torque converter exhibits all of the negative characteristics described above. However, the addition of an integral lock up clutch removes the inherent and inefficient slip of the hydrodynamic torque converter. The lock up clutch creates a direct mechanical connection between the hydrodynamic torque converter's input and output. However, this leads to torsional transmissibility (vibration) of the transmission system. As a result, hydrodynamic torque converters that incorporate an integral lockup clutch require a specific torsional dampening device. Additional difficulties with existing systems will be apparent in view of the detailed description of embodiments below.

SUMMARY OF THE INVENTION

In one aspect, the present invention is directed to a controllable powertrain input module controlled by a powertrain control module to optimize and exhibit increased efficiency, controllability, and performance characteristics in providing the function of transmission systems.

In one aspect, the invention is directed to a controllable powertrain input module comprising a housing. The housing is connected to an input torque source. The input module includes a planetary gear set assembly, a multi-plate wet friction input clutch assembly splined to an internal diameter of the housing, an axially moveable hydraulic input clutch piston. The clutch piston applies specific controlled clamping force to the input clutch assembly and supplies specific cooling flow to at least one friction plate of the input clutch assembly via a high pressure volume. The input module further comprises a multiplate wet friction mode shift clutch assembly splined to the internal diameter of the housing, an axially moveable hydraulic mode shift clutch piston which applies specific controlled clamping force to mode shift clutch assembly, a reaction plate disposed within the internal diameter of housing. The reaction plate functionally interfaces with both the input clutch assembly and the mode shift clutch assembly. Also included is a locking device configured to allow angular rotation of the planetary gear set in one direction only.

In some embodiments, the input clutch assembly comprises a plurality of steel separation plates functioning as an input torque path to input clutch assembly, a plurality of friction plates disposed between each steel separation plate, functioning as output torque path for the input clutch assembly and an annular continuous slipping wet friction clutch, integral with the powertrain input module, having at least one pair of annular interfaces adapted to engage with each other while output to input speed ratio varies between 0 (zero) and 1:1, one of the interfaces having a prescribed width and at least one circuitous groove extending a prescribed annular distance about the one interface and adapted to direct hydraulic fluid from high pressure volume at an outer edge of the interface and across the width of the interface in a circuitous path in at least three traversing passes to low pressure volume at an inner edge of the one interface, each of the passes extending substantially the entire width of the one interface, the groove having an inlet section that defines one of the passes and has an inlet adapted to open the groove at the outer edge of the one interface to the high pressure volumes, and the groove having an outlet section that defines another of the passes and has an outlet adapted to open the groove at the inner edge of the one interface to the low pressure cavity at an angular location remote from the inlet.

In some embodiments, the annular interfaces communicate with high pressure volume, and clutch pistons to apply pressure in concert with outlet to define a precise distribution of cooling fluid flow to the interface surface. Cooling fluid flow is controlled based on torque and slip speed functional demands and the piston applies one or more of pressure versus torque and slip speed requested versus heat generated at the interface versus cooling fluid flow required to mitigate interface temperature for each requested functional request. Absolute flow is thus a function of pressure differential between volumes and groove cross sectional area and number of grooves at each interface.

In some embodiments, the inlet is angled generally in a direction opposite to input rotational direction and the outlet generally angles in the direction of input rotational direction.

In some embodiments, the input clutch assembly comprises a paper or non-paper based friction material facing that forms the one interface, and the groove is formed and extends through the friction material facing or extends through the interface.

In some embodiments, the input clutch assembly comprises a plurality of grooves angularly spaced about the interface and connected in parallel with each other between high pressure volume and low pressure volume. In at least some embodiments, the groove may have a uniform cross sectional flow area.

In at least some embodiments the plurality of friction plates further comprise a friction material facing having a prescribed width and at least one circuitous distance about the facing adapted to direct hydraulic fluid from high pressure volume at an outer edge of the facing in a circuitous path in at least three traversing passes to low pressure volume at an inner edge of the facing, each of the passes extending substantially the entire width of the facing, the groove having an inlet section that defines one of the passes and is adapted to open the groove at the outer edge of the facing to the high pressure volume, and the groove having an outlet section adapted to open the groove at the inner edge of the facing to the low pressure volume at an angular location remote from the inlet In some embodiments, the facing comprises four grooves equally spaced about the facing and there are five traversing passes. The facing may also comprise multiple strategically placed semi-circle shaped cut out sections that are placed to provide hydraulic fluid exposure to both an outer radius and inner radius for cooling the small section of facing not traversed by the circuitous groove. The grooves may also have straight traversing passes of constant cross-sectional flow area one or more pointed return bends joining the straight traversing passes, and the return bends are located closely adjacent to the edge at both outside and inside diameters of facing.

In some embodiments, the groove has a smooth sinusoidal shape with apexes located closely adjacent to outside and inside diameter edges of the facing.

In some embodiments, the groove of clutch facing does not present continuous cross sectional area with an apex area and inlet and outlet areas are configured to present local areas of increased cross sectional flow areas to promote secondary fluid pump action within the groove and provide strategically placed accumulation zones along the circuitous groove.

In some embodiments, the input clutch assembly applies a force which dictates clutch output torque and clutch slip speed and the force is caused by hydraulic pressure to the input clutch piston as commanded from a powertrain control module.

In some embodiments, the input clutch assembly functions as one or more of a start-up launch device with precise slip speed control and heat rejection characteristics whereby smooth output torque is produced, a torsional transmissibility mitigation device using precisely controlled slip as commanded from a powertrain control module, a zero slip lock up device configured to maximize total system efficiency through launches and gear ratio shifts based on commands from a powertrain control module, and a neutral device in its open state resulting in substantially zero torque drain upon the input torque source. In operation, when the input clutch assembly is activated, the planetary gear set provides an additional input ratio into a downstream powertrain transmission system and the input ratio can be utilized by the powertrain control module against the existing downstream transmission system ratios, to create new ratio combinations within the total transmission system such that the total powertrain transmission system enables the engine to be run more frequently at or near its point of maximum efficiency.

In some embodiments, the planetary gear set assembly is comprised of a ring gear functioning as an input, a sun gear functioning as a reaction member, and a carrier which houses a plurality of individual pinion gears in position, and serves as a module output device by means of a flanged and splined hub.

The planetary gear set assembly may also provide two distinct input and output torque ratios, with capability to accommodate kinematic torque flow switching to create a desired torque ratio, and the planetary gear set comprises a torque flow arrangement in which the input clutch assembly provides input torque to the ring gear, the sun gear functions as the reaction element, the carrier assembly functions as the output torque element, and the sun gear houses the locking device, acting as an output member and in which the locking device is integral with the sun gear and a torque ratio greater than 1.0 is created at the carrier assembly when the locking device locks the reactionary sun gear from rotating.

The planetary gear set assembly may also comprise a torque flow arrangement in which the mode clutch when activated operatively connects an input shaft to the sun gear in concert with the mode clutch operatively connecting the input shaft to the ring gear thereby fixably connecting the ring gear and sun gear to the input shaft such that planetary gear set assembly rotates as one unit fixably connecting input shaft to the carrier assembly and wherein this kinematic connection fixably dictates rotation of the sun gear to rotate with input shaft and the transition from fixed position to rotation dictates that locking device unlocks, allowing the sun gear to free wheel whereby a torque ratio of 1.0 is created at the carrier assembly.

Descriptive references herein such as "front", "left", "right", "top", "bottom", "above", "below", "level", "upright", "parallel", "perpendicular", "straight", "horizontal", "vertical", or "opposite" are for convenience of description only. It will be appreciated by one skilled in the art that the placement of an element may depart from these configurations while still remaining within the scope of the present disclosure

BRIEF DESCRIPTION OF THE DRAWINGS

The detailed description and drawings illustrate by way of example non-limiting embodiments of the invention contemplated herein.

DETAILED DESCRIPTION OF THE INVENTION

Figure 1:
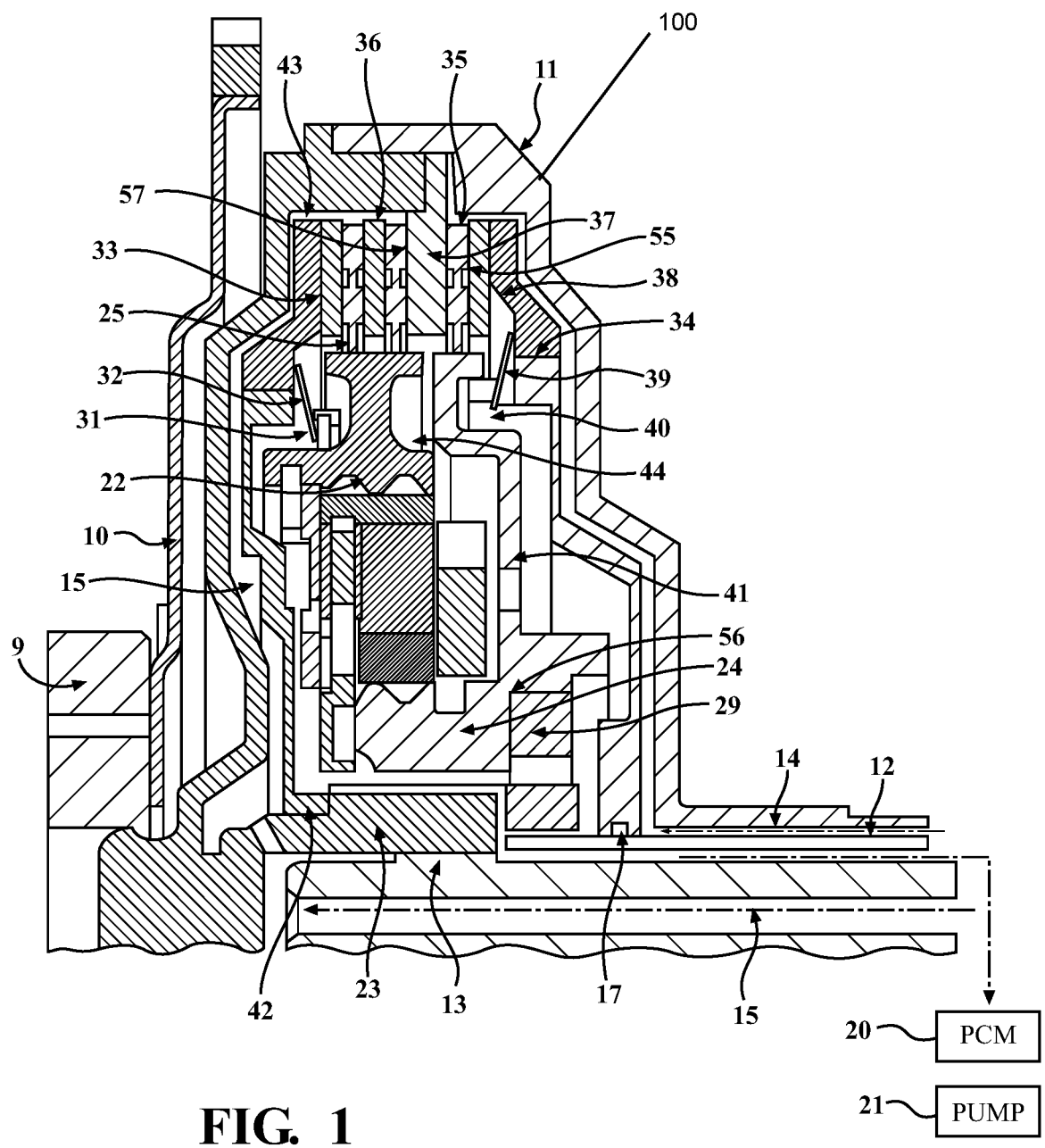
FIG. 1 is a partial longitudinal sectional view of a powertrain input module according to an embodiment of the present invention.
Figure 2:
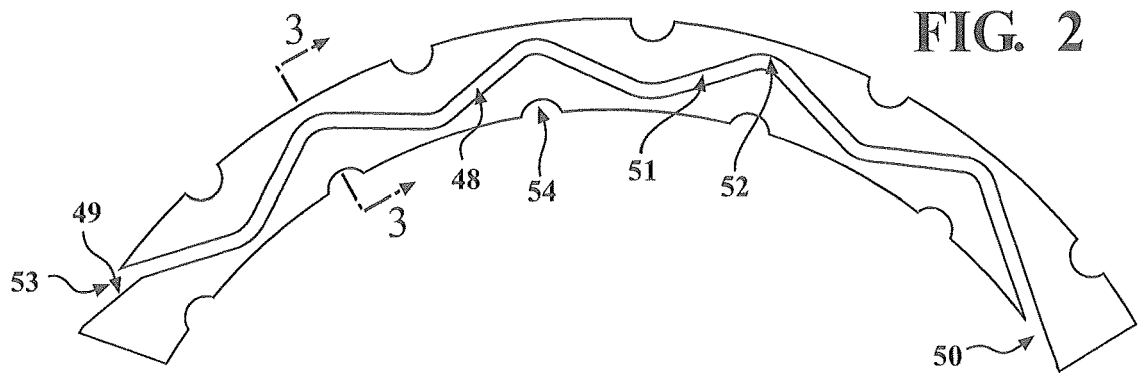
FIG. 2 is a partial cross-sectional view of a circulation groove pattern for the clutch friction plate for input and mode clutches according to an embodiment of the present invention.
Figure 3:
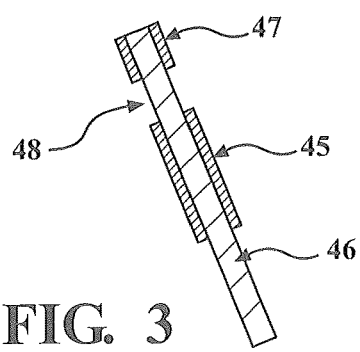
FIG. 3 is a partial view of the circulation groove pattern in FIG. 2 taken along line 3-3 looking in the direction of the arrows.
Figure 4:
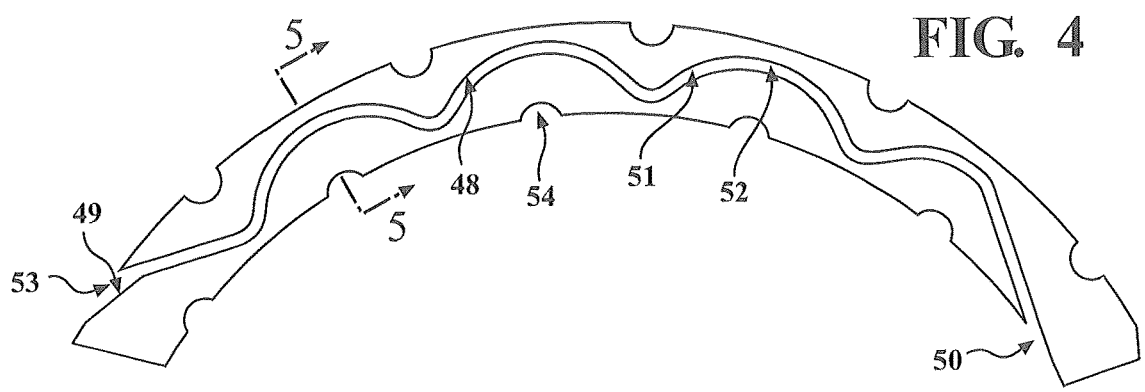
FIG. 4 is a partial cross-sectional view of a circulation groove pattern for the clutch friction plate for input and mode clutches according to an embodiment of the present invention.
Figure 5:
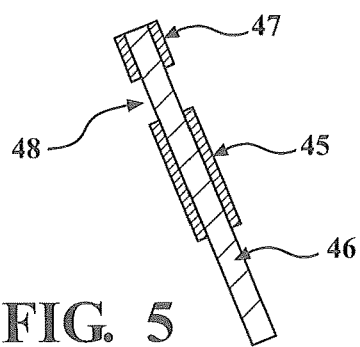
FIG. 5 is a partial view of the circulation groove pattern in FIG. 4 taken along line 5-5 looking in the direction of the arrows.

Referring to FIG. 1, according to an embodiment of the present invention, the present invention is directed to a powertrain input module 100. The powertrain input module is enclosed in a housing 11. The upper connection of powertrain input module 100 is shown operatively connected to an input power source 9 by means of an applications related adapter plate 10. The output of the input module 100 is operatively connected to a downstream powertrain system input shaft 13. The downstream powertrain system (not shown) to which the input module 100 is connected may be any powertrain system known in the art, for example, a vehicle automatic transmission or other transmission system. The powertrain input module 100 further includes a precision slip controlled wet friction mode input clutch assembly 57 operatively connected to the module housing 11 by steel separator plates 36 which function as an input component. Friction plates 35 are operatively connected to a ring gear 25 of a planetary gear set assembly 22 which functions as an output component. Also operatively connected to module housing 11 is a second wet friction mode shift clutch assembly 55 with steel separator plates 36 as an input component and friction plates 35 as an output component and which are operatively connected through attachment component 41 of the planetary gear set assembly 22 and sun gear 24. Planetary gear set assembly 22 may also include a plurality of pinion gears, as may be seen in the schematic shown in FIG. 6.

According to an embodiment of the present invention, planetary gear set assembly 22 accepts input power from input clutch 57 and provides, through output member carrier assembly 23, torque multiplication (speed reduction) to downstream powertrain input shaft 13. Torque multiplication of planetary gear set assembly 22 is dependent upon the reaction element functional mode of sun gear 24. In region 56, the sun gear assembly 24 incorporates an integrated angular rotation locking device 29 in one direction. In some embodiments locking device 29 may be a one way clutch. In operation, locking device 29 operates by forcing the sun gear 24 to not respond to its kinematic reaction force to rotate in the reverse direction. Thus, sun gear 24 remains stationary. Consequently the kinematic scenario described above provides for planetary gear assembly 22 and output member carrier assembly 23 to function in torque multiplication (speed reduction) mode.

Compared to a current art torque converter device, the planetary gear set 22 within the controllable powertrain input module 20 may thus maintain an efficient and continuous input torque multiplication through the entire launch start up event resulting in a general increase in the tractive effort acceleration force supplied to the entire transmission system such as in a vehicle.

Locking device 29, which in some embodiments is integral to sun gear 24, is grounded to a stationary member from host powertrain housing 12. Both input clutch 57 and mode clutch 55 provide input to the planetary gear set assembly 22 dependent upon a specific functional command to input clutch 57 and mode clutch 55. The functional commands may be sent by a powertrain control module (PCM) 20. PCM units as are known in the art may be used in conjunction with input module 100. PCM 20 may incorporate various sensors and control units including engine control and transmission control units and may communicate bi-directionally with input module 100. Commands to each of input clutch 57 and mode clutch 55, may be in the form of hydraulic pressure applied to input clutch 57 via circuit 15 and to mode clutch 55 via circuit 14. Commands may be sent to input clutch 57 and mode clutch 55 by other means depending on the nature of the transmission system. For example, electronic transmission systems may use electronic means to send commands to input clutch 57 and mode clutch 55.

In operation, as hydraulic fluid, for example, automatic transmission fluid, is directed to input clutch 57 via circuit 15 it fills and pressurizes the sealed volume behind input clutch piston 33 producing piston movement against return spring 32 (for example a belleville spring) of input clutch 57 and applying a clamping force against separator plates 36, friction plates 35, and reaction plate 37 of input clutch 57 enabling input clutch 57 to generate an output torque distributed to ring gear 25 of planetary gear set assembly 22. In some embodiments of the present invention, Input clutch 57 functions to deliver PCM 20 commanded launch torque by precise management of clutch slip, delivering precise micro slips (incipient to 40 RPM) for torsional transmissibility mitigation, as required in a total system lock up.

Similarly for mode clutch 55, in operation, as hydraulic fluid (for example, automatic transmission fluid) is directed to mode clutch 55 via circuit 14, it fills and pressurizes the sealed volume behind mode clutch piston 38 providing piston movement against mode clutch return spring 39 (which in some embodiments of the present invention, may be a belleville spring) and applying a clamping force against mode clutch separator plates 36, friction plates 35, and reaction plate 37 causing the mode clutch 55 to generate output torque distributed to planetary gear assembly 22 via sun gear 24. In some embodiments of the present invention, mode clutch 55 functions to deliver PCM 20 commanded torque to sun gear 24 to overcome its kinematic reaction forces and to generate a kinematic environment that causes the components of planetary gear set assembly 22 to rotate as one unit. This arrangement creates a system shift to a 1:1 input/output speed and torque delivery and in operation, causes sun gear 24 to operate in only a single direction using locking device 29 thus allowing total system rotation in the input direction. Mode clutch 55 also delivers precise micro slips (incipient to 40 RPM) in concert with the input clutch 57 as commanded by PCM 20 for torsional transmissibility mitigation as well as total system lock up.

Precise control, minimization or elimination of internal slip within the powertrain input module compared to a current art torque converter creates an improvement in total system efficiency at all points in the operating envelope of the transmission system.

Figure 6:
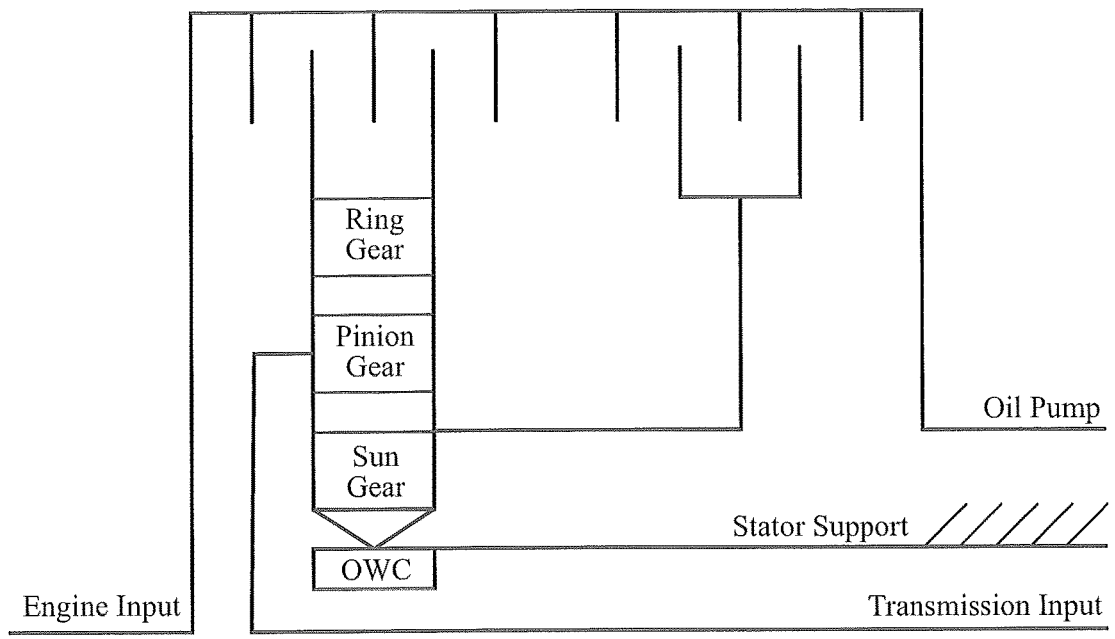
FIG. 6 is a schematic of a power flow configuration in a transmission system using a powertrain input module according to an embodiment of the present invention.
Figure 7:
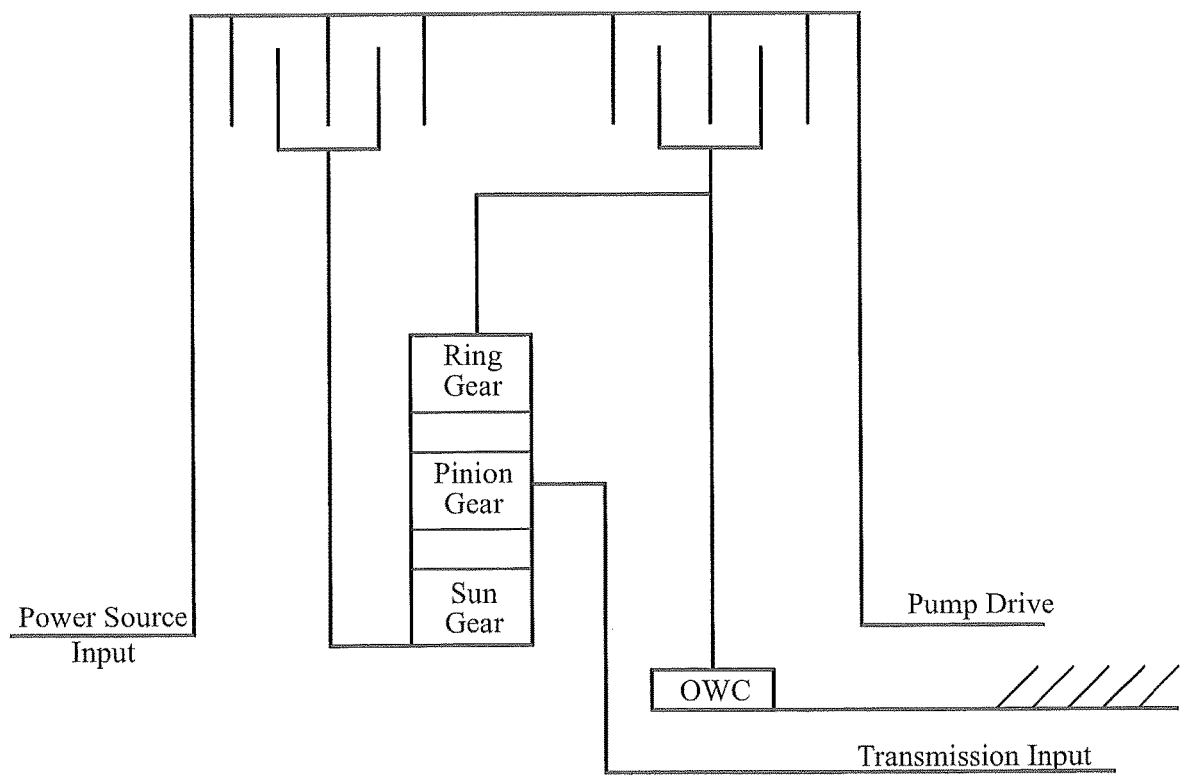
FIG. 7 is a schematic of an alternate power configuration flow in a transmission system using a powertrain input module according to an embodiment of the present invention.

Embodiments of the present invention may be integrated into transmission systems in a number of ways depending on the application. For example, a transmission system for an on-highway vehicle may require a different configuration than one for an off-road vehicle. FIGS. 6 and 7 show example power flow configurations for transmission systems using embodiments of the present invention. It will be appreciated that various modifications may be made and different configurations may be used integrating input module 100 into various transmission systems know in the art. For example, the power source input may be an engine as shown in FIG. 6 and may include additional components such as a stator support, a one way clutch, which may be a component of one or more of the input clutch assembly 57 or mode clutch assembly 55. Oil pumps or pump drives such as pump 21 may also be included to provide lubrication for the transmission system. The locations and configuration of these and other sub-systems may vary depending on the specific application.

In one aspect of the present invention, there is also provided a novel means of delivering hydraulic cooling fluid to function interface zones 47 of input clutch 57 and mode clutch 55. Each apply clutch piston 33 and 38 has an annular volume behind it fed by hydraulic control fluid sealed on the inner diameter (I.D.) of the pistons 33, 38 by piston seals 34 and on the Outer diameter (O.D.) annular volume defined by housing 11, reaction plate 37, and clutch friction plates 35 exhibiting a flow area from O.D. high pressure area 43 to I.D. low pressure area 44, which is defined by the number and size of each circuitous groove 48 to control flow versus pressure. This configuration describes a direct correlation of input energy request to clutch applied pressure to volume of coolant flow to all friction interface zones 47 maintaining optimum wetting and cooling conditions.

In one aspect of the present invention, there is also provided one or more highly effective circuitous grooves 48 in each interface zone 47 of input clutch 57 and mode clutch 55 wherein the grooves 48 are separate and independent of each other and function to provide both sufficient cooling and maintain boundary layer wetting of clutch interfaces mitigating the occurrence of dry friction resulting in catastrophic interface temperatures.

Referring now to FIGS. 2 to 5, each of the circuitous grooves 48 extends a substantial distance in an annular direction about the interface 47 and has an inlet 49 at one end and an outlet 50 at the opposite end. The inlet 49 is open to the high pressure volume 43 at the O.D. of the friction material interface 47 and the outlet 50 is angularly remote from the inlet and open to the low pressure volume 44 at the I.D. of the frictional material interface 47. Each groove 48 traverses back and forth between its inlet 49 and outlet 50 in at least three (3) or more passes 51 across substantially the entire width of each friction facing material 45 and thus its interface zone 47 to direct hydraulic fluid as described herein from the high pressure volume 43 past the engaged clutch faces (interface zone 47) in circuitous traversing flow passes to the low pressure volume to establish:
a) wetting of essentially the entire active area of clutch interfaces;
b) cooling of the clutch with a viscous pumping action that augments cooling hydraulic fluid flow induced by the pressure differential; and
c) flow limiting action wherein the groove 48 functions as a critical flow limiting orifice between the high pressure inlet 49 and low pressure outlet 50 within powertrain input module 100. To assist the viscous pumping action by the slipping (differential speed) of the respective input and output components and related interfaces, the circuitous grooves 48 have a traversing inlet section 49 that also forms one of the passes 51 and is angled in the direction of subject invention input rotation. The number of traversing passes 51 of the grooves 48, the length of grooves 48, the width and depth of grooves 48, and the inlet 49/outlet 50 angles along with the angles of traversing passes 51 may be varied depending on the application (automobile, on-highway vehicle, or other application) for the powertrain input module 100.

The multifunction wetting/cooling/flow limiting grooves 48 of the powertrain input module 100 provide for flexibility in controlling hydraulic flow through the clutch interface zones 47 when subjected to the relatively high and low pressure in the high pressure volume 43 and low pressure volume 44 at the respective outer and inner edges, or diameter, of the interfaces 47 wherein in the control of the input clutch 57 and/or mode clutch 55, the differential pressure between volumes 43, 44, may vary for example from a high of about 130 psi to a low of about 10 psi to control the clutch slip speed. In addition, in each of the inlet 49 and outlet 50, there exists small I.D./O.D. interface areas not swept by traversing passes 51. To ensure that all of interface friction area 47 receives effective wetting action small I.D./O.D. reliefs 54 are strategically placed to provide added exposure to cooling aid to potential interface areas not swept by traversing passes 51 of the circuitous grooves 48.

In at least some embodiments of the present invention, the torsional signature characteristics typical of all combustion piston engine power input systems, which exhibit torsional disturbances of varying frequency and amplitude can be controlled and mitigated by the powertrain input module 100 without the integration of a current art mechanical torsional damper. Further, the performance of any on and off highway/all-terrain/commercial vehicle fitted with the controllable powertrain input module 100, may be enhanced by the discreet expansion of the downstream powertrain transmission system ratios without any modification to the existing downstream powertrain transmission system power-flow architecture or hardware.

The external powertrain control module 20 can also command real time modification of the powertrain input module 100 characteristics as dictated by variable and changing operating conditions.

Compared to a current art torque converter, the powertrain input module 100 may also satisfy multiple application requirements without the need of any modifications to the downstream powertrain transmission system power flow architecture or hardware.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. The subject matter described herein and in the recited claims intends to cover and embrace all suitable changes in technology.

What is claimed is:

1. A controllable powertrain input module 100, comprising:
   a) a housing which is connected to an input torque source;
   b) a planetary gear set assembly;
   c) a multi-plate wet friction input clutch assembly splined to an internal diameter of the housing;
   d) an axially moveable hydraulic input clutch piston wherein the clutch piston applies specific controlled clamping force to the input clutch assembly and supplies specific cooling flow to at least one friction plate of the input clutch assembly via a first pressure volume;
   e) a multi-plate wet friction mode shift clutch assembly splined to the internal diameter of the housing;
   f) an axially moveable hydraulic mode shift clutch piston which applies specific controlled clamping force to the mode shift clutch assembly;
   g) a reaction plate disposed within the internal diameter of the housing wherein the reaction plate functionally interfaces with both the input clutch assembly and the mode shift clutch assembly; and
   h) a locking device configured to allow angular rotation of the planetary gear set assembly in one direction only.

2. The input module according to claim 1 wherein the input clutch assembly comprises:
   a) a plurality of steel separation plates functioning as an input torque path to the input clutch assembly;
   b) a plurality of friction plates disposed between each steel separation plate, functioning as an output torque path for the input clutch assembly;
   c) an annular continuous slipping wet friction clutch, integral with the powertrain input module, having at least one pair of annular first and second interfaces adapted to engage with each other while output to input speed ratio varies between 0 (zero) and 1:1, said first interface having a prescribed width and at least one circuitous groove extending a prescribed annular distance about the first interface and adapted to direct hydraulic fluid from the first pressure volume at an outer edge of the first interface and across the width of the first interface in a circuitous path in at least three traversing passes to a second pressure volume at an inner edge of the first interface, said second pressure volume having a second pressure that is lower than a first pressure in said first pressure volume, each of the passes extending substantially the entire width of the first interface, the groove having an inlet section that defines one of the passes and has an inlet adapted to open the groove at the outer edge of the one interface to the first pressure volume, and the groove having an outlet section that defines another of the passes and has an outlet adapted to open the groove at the inner edge of the first interface to the second pressure volume at an angular location remote from the inlet.

3. The input module according to claim 1 wherein the input clutch assembly comprises an annular continuous slip wet friction clutch having at least one pair of annular interfaces with one or more circuitous grooves with an inlet and outlet and wherein the inlet communicates with the first pressure volume which communicates with the clutch pistons to apply pressure in concert with the outlet which communicates with a second pressure volume to define a precise distribution of cooling fluid flow to interface surface, said first pressure volume having a first pressure and said second pressure volume has a second pressure lower than said first pressure, wherein cooling fluid flow is controlled based on torque and slip speed functional demands wherein the mode shift clutch piston applies one or more of pressure versus torque and slip speed requested versus heat generated at the interface temperature for each requested functional request and wherein absolute flow is a function of pressure differential between the high pressure and low pressure volumes and groove cross sectional area and number of grooves at each interface.

4. The input module according to claim 2 wherein the input clutch assembly comprises an annular continuous slip wet friction clutch wherein the inlet section is angled generally in a direction opposite to an input rotational direction, and the outlet section generally angles in the direction of the input rotational direction.

5. The input module according to claim 2 wherein the input clutch assembly further comprises a paper based friction material facing that forms the first interface, and the groove is formed and extends through the friction facing material.

6. The input module according to claim 2 wherein the input clutch assembly comprises a non-paper based friction material facing that forms the first interface, and the groove is formed in and extends through the first interface.

7. The input module according to claim 2 wherein the input clutch assembly comprises a plurality of grooves angularly spaced about the first interface between the first pressure volume and second pressure volume and wherein the grooves are connected in parallel with each other.

8. The input module according to claim 2 wherein the groove has a uniform cross-sectional flow area.

9. The input module according to claim 2 wherein the plurality of friction plates further comprise a friction material facing having a prescribed width and at least one circuitous distance about the facing adapted to direct hydraulic fluid from the first pressure volume at an outer edge of the facing in a circuitous path in at least three traversing passes to the second pressure volume at an inner edge of the facing, each of the passes extending substantially the entire width of the facing, wherein the inlet section of the groove defines one of the passes and is adapted to open the groove at the outer edge of the facing to the first pressure volume, and the outlet section of the groove is adapted to open the groove at the inner edge of the facing to the second pressure volume at an angular location remote from the inlet.

10. The input module according to claim 9 wherein the facing comprises four grooves equally spaced about the facing and there are five traversing passes.

11. The input module according to claim 9 wherein the facing further comprises multiple strategically placed semi-circle shaped cut out sections that are placed to provide hydraulic fluid exposure to both an outer radius and inner radius for cooling the section of the facing not traversed by the circuitous groove.

12. The input module according to claim 9 wherein the facing comprises the groove having straight traversing passes of constant cross sectional flow area and one or more pointed return bends joining the straight traversing passes, and the return bends are located closely adjacent to the edge at both outside and inside diameters of facing.

13. The input module according to claim 9 wherein the groove of the facing has a smooth sinusoidal shape with apexes located closely adjacent to outside and inside diameter edges of the facing.

14. The input module according to claim 9 wherein the groove of the facing does not present continuous cross sectional area with an apex area and wherein the inlet and outlet areas are configured to present local areas of increased cross sectional flow areas to promote secondary fluid pump action within the groove and provide strategically placed accumulation zones along the circuitous groove.

15. The input module according to claim 2 wherein the input clutch assembly applies a force which dictates clutch output torque and clutch slip speed wherein the force is a hydraulic pressure to the input clutch piston as commanded from a powertrain control module.

16. The input module according to claim 1 wherein the input clutch assembly functions as one or more of:
   a) a start up launch device with precise slip speed control and heat rejection characteristics whereby smooth output torque is produced;
   b) a torsional transmissibility mitigation device using precisely controlled slip as commanded from powertrain control module;
   c) a zero slip lock up device configured to maximize total system efficiency through launches and gear ratio shifts based on commands from powertrain control module;
   d) a neutral device in its open state resulting in substantially zero torque drain upon the input torque source; and
   e) wherein when the input clutch assembly is activated, the planetary gear set assembly provides an additional input ratio into a downstream powertrain transmission system and wherein the input ratio can be utilized by powertrain control module against the existing downstream transmission system ratios, to create new ratio combinations within the total transmission system and whereby the total powertrain transmission system enables the engine to be run more frequently at or near its point of maximum efficiency.

17. The controllable powertrain input module according to claim 1 wherein the planetary gear set assembly comprises:
   a) a ring gear functioning as an input of planetary gear set assembly;
   b) a sun gear functioning as a reaction member of planetary gear set assembly 22; and
   c) a carrier assembly for the planetary gear set assembly, which houses a plurality of individual pinion gears in position, and serves as a module output device by means of a flanged and splined hub.

18. The input module according to claim 17, wherein:
   a) the planetary gear set assembly provides two distinct input and output torque ratios, with capability to accommodate kinematic torque flow switching to create a desired torque ratio; and
   b) the planetary gear set assembly comprises a torque flow arrangement wherein the input clutch assembly provides input torque to the ring gear, and the sun gear functions as the reaction element, the carrier assembly functions as the output torque element, and the sun gear houses the locking device acting as an output member, and wherein the locking device is integral with the sun gear and a torque ratio greater than 1.0 is created at the carrier assembly when the locking device locks the sun gear from rotating.

19. The input module according to claim 17, wherein the planetary gear set comprises a torque flow arrangement wherein the mode clutch when activated operatively connects an input shaft to the sun gear reaction element in concert with the mode clutch operatively connecting the input shaft to the ring gear thereby fixably connecting the ring gear and sun gear to the input shaft such that the planetary gear set assembly rotates as one unit fixably connecting input shaft to output carrier assembly and wherein this kinematic connection fixably dictates rotation of the sun gear to rotate with the input shaft and the transition from fixed position to rotation dictates that the locking device unlocks whereby the sun gear is capable to free wheel and a torque ratio of 1.0 is created at the carrier assembly.

* * * * *